R. E. GREGG.
PREMIUM CERTIFICATE.
APPLICATION FILED NOV. 7, 1914.

1,149,044.

Patented Aug. 3, 1915.

WITNESSES

INVENTOR
Robert Ely Gregg
BY
ATTORNEYS

UNITED STATES PATENT OFFICE.

ROBERT ELY GREGG, OF INDIANAPOLIS, INDIANA, ASSIGNOR TO THE HAMILTON CORPORATION, OF NEW YORK, N. Y., A CORPORATION OF DELAWARE.

PREMIUM-CERTIFICATE.

1,149,044.     Specification of Letters Patent.     Patented Aug. 3, 1915.

Application filed November 7, 1914. Serial No. 870,812.

*To all whom it may concern:*

Be it known that I, ROBERT ELY GREGG, a citizen of the United States, and a resident of Indianapolis, in the county of Marion and State of Indiana, have invented a new and Improved Premium-Certificate, of which the following is a full, clear, and exact description.

The invention relates to certificates, stamps, coupons and like instruments issued in conjunction with the sale or distribution of articles of merchandise and redeemable for valuable premiums.

The object of the invention is to provide a new and improved premium certificate arranged to induce trade or patronage of particular articles of merchandise to the manufacturer, seller or distributer of such articles, and to enable the purchaser of such articles of merchandise to obtain a valuable premium and an additional consideration to be used by the purchaser as a gift and which is of no value to the purchaser of the articles of merchandise and only becomes valuable when received and used by a third party, such as a church, Sunday school, hospital, charitable organization or other beneficent institution.

In order to accomplish the desired result, use is made of redeemable coupons detachably connected with each other, one of the said coupons bearing conventional indications to constitute a purchaser's coupon redeemable for a valuable premium, and the other coupon bearing conventional indications to constitute a benefaction coupon transferable by the purchaser to a third party and redeemable by the latter for a valuable consideration.

A practical embodiment of the invention is represented in the accompanying drawings forming a part of this specification, in which similar characters of reference indicate corresponding parts in both views.

Figure 1:
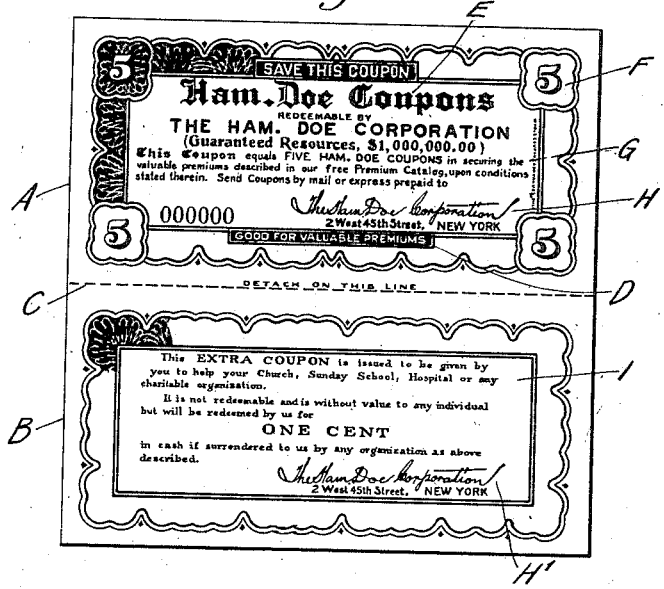
Figure 2:
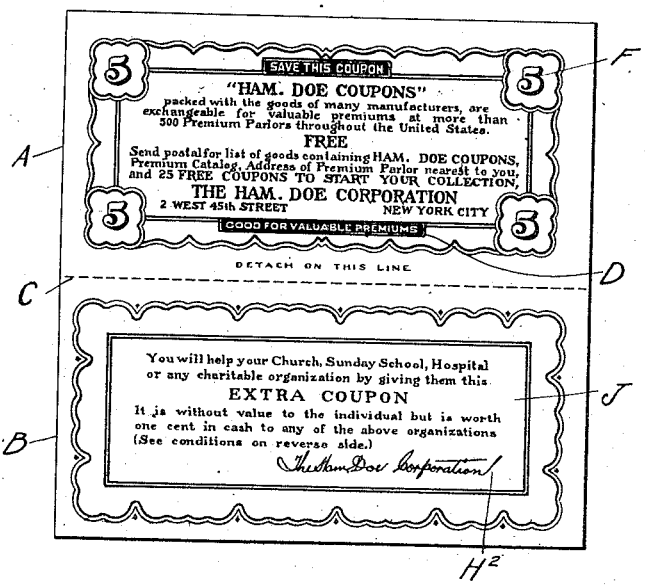

Figure 1 is a plan view of one face of the premium certificate; and Fig. 2 is a similar view of the other face of the premium certificate.

The premium certificate is in the form of a strip of paper or like material divided into a main coupon A and an auxiliary coupon B, the coupons being separated by a row of perforations, lines or other separable means C to permit of conveniently separating or detaching the coupon B from the coupon A. In the preferred embodiment of the invention as shown in Figs. 1 and 2, the main coupon A is provided on one face with conventional indications in the form of printed matter to constitute a purchaser's coupon redeemable for a valuable premium; for instance, as shown in Figs. 1 and 2, the coupon A bears the legend D "Good for valuable premiums" and also contains the legend E "This coupon equals 5 Ham. Doe coupons in securing the valuable premiums described in our free premium catalogue upon the conditions stated therein." It is understood that the coupons are issued in various denominations. The coupon also bears the facsimile signature H of the issuing party. The other face of the coupon A discloses the same value F as shown on the other face and it also bears the following legend: "Ham. Doe coupons packed with the goods of many manufacturers are exchangeable for valuable premiums at more than 500 premium parlors throughout the United States. Send postal for list of goods containing Ham. Doe coupons, premium catalogue, address of premium parlor nearest to you and 25 free coupons to start your collection. The Ham. Doe Corporation" and the address thereof.

The auxiliary coupon B bears the following legend I on one face (see Fig. 1) : "This extra coupon is issued to be given by you to help your church, Sunday school, hospital or any charitable organization. It is not redeemable and is without value to any individual but will be redeemed by us for one cent in cash if surrendered to us by any organization, as above described." Below this legend is the facsimile signature H' of the issuing party. The other face of the coupon B contains the following legend J: "You will help your church, Sunday school, hospital or any charitable organization by giving them this extra coupon. It is without value to the individual but is worth one cent in cash to any of the above organizations (see conditions on reverse side)." Below this legend is again the signature $H^2$ of the issuing party.

From the foregoing it will be seen that both coupons A and B are redeemable, the coupon A being used by the purchaser of the articles of merchandise for obtaining a valuable premium from the issuing party, and the other coupon being a benefaction coupon transferable by the purchaser to a third party and redeemable by the latter for a cash consideration. The coupon B is not redeemable by the purchaser but can be used by the latter as a gift to a beneficient institution.

It will be noticed that the issuing of a premium certificate of this type tends to advertise the merchandise of a manufacturer or dealer and thus induces trade or patronage of particular articles of merchandise with which the certificates are given on buying said articles especially as the purchaser of the articles of merchandise has an inducement to again buy the articles of merchandise with which the certificates are given, and the beneficent institution which receives the extra coupon B has an object in inducing other parties to buy articles of merchandise with which the premium certificates are given free of charge.

Having thus described my invention, I claim as new and desire to secure by Letters Patent:

1. A premium certificate, comprising redeemable coupons detachably connected with each other, one of the said coupons bearing conventional indications to constitute a purchaser's coupon redeemable for a valuable premium, and the other coupon bearing conventional indications to constitute a benefaction coupon transferable by the purchaser to a third party and redeemable by the latter for a valuable consideration.

2. A premium certificate, comprising redeemable coupons detachably connected with each other and issued as whole by an issuing party with the sale of merchandise, one of the said coupons bearing conventional indications to constitute a purchaser's coupon redeemable for a valuable premium, and the other coupon bearing conventional indications to constitute a benefaction coupon transferable to a beneficent institution and redeemable only by the latter for a cash consideration.

3. A premium certificate, comprising a main coupon and an auxiliary coupon, the coupons being detachably connected with each other, the said main coupon bearing conventional indications to constitute a purchaser's coupon redeemable for a valuable premium by the purchaser, and the said auxiliary coupon bearing conventional indications to constitute a non-personal benefaction coupon transferable only by the latter for a cash consideration.

4. A premium certificate, comprising a main coupon and an auxiliary detachable coupon, said main coupon and said auxiliary coupon having conventional matter thereon indicating the value of each to different parties.

5. A premium certificate, comprising a main coupon and an auxiliary detachable coupon, said main coupon having conventional matter thereon indicating its value to a purchaser of goods from the party issuing said certificate, and said auxiliary coupon having conventional matter thereon indicating its value to a party other than said purchaser.

6. A premium certificate, comprising a main coupon and an auxiliary detachable coupon, said main coupon having conventional matter thereon indicating its value in commodities to the person to whom said certificate is issued and said auxiliary coupon having conventional matter thereon indicating its value in cash to a party to whom said coupon is given.

7. A premium certificate, comprising a main coupon and an auxiliary detachable coupon, each having conventional matter thereon indicating the value thereof to different parties when said auxiliary coupon is detached from said main coupon portion.

In testimony whereof I have signed my name to this specification in the presence of two subscribing witnesses.

ROBERT ELY GREGG.

Witnesses:
A. M. HIRST,
MARTHA SEERY.